(No Model.) 3 Sheets—Sheet 1.
M. MORTON & W. ROWAN.
COMBINED FEED CUTTER AND CORN HUSKER.
No. 468,817. Patented Feb. 16, 1892.
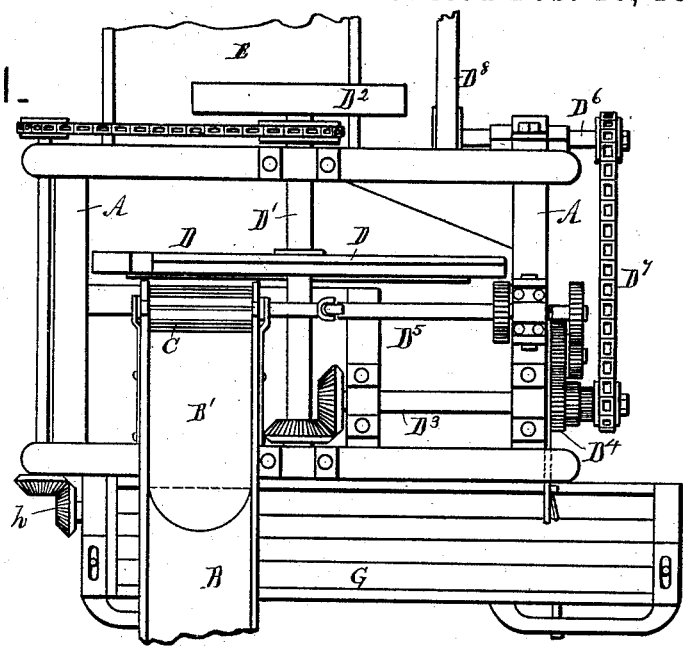
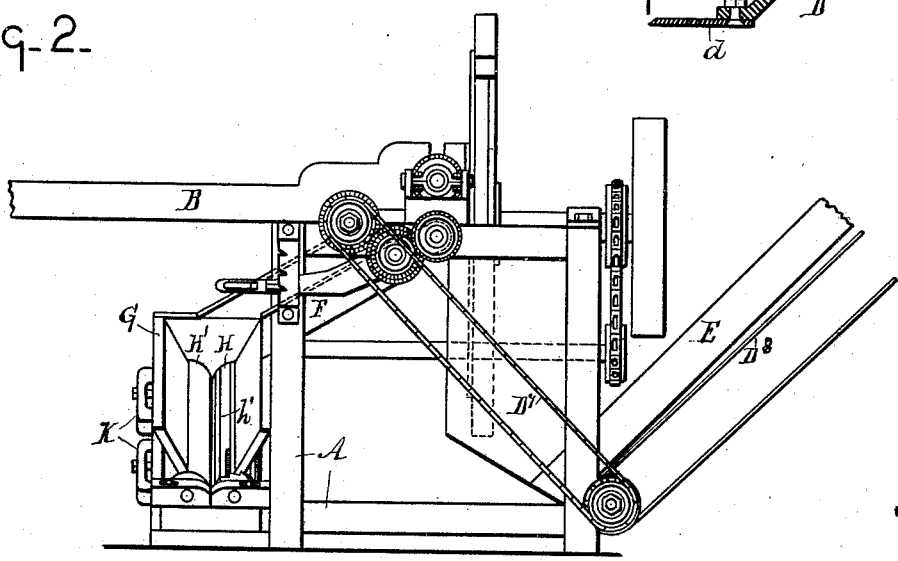
WITNESSES
C. J. Shipley
F. Clough
INVENTORS:
Matthew Morton
William Rowan
By Cads W Leggett
Attorneys.
THE NORRIS PETERS CO., PHOTO-LITHO., WASHINGTON, D. C.

(No Model.) 3 Sheets—Sheet 2.
M. MORTON & W. ROWAN.
COMBINED FEED CUTTER AND CORN HUSKER.
No. 468,817. Patented Feb. 16, 1892.
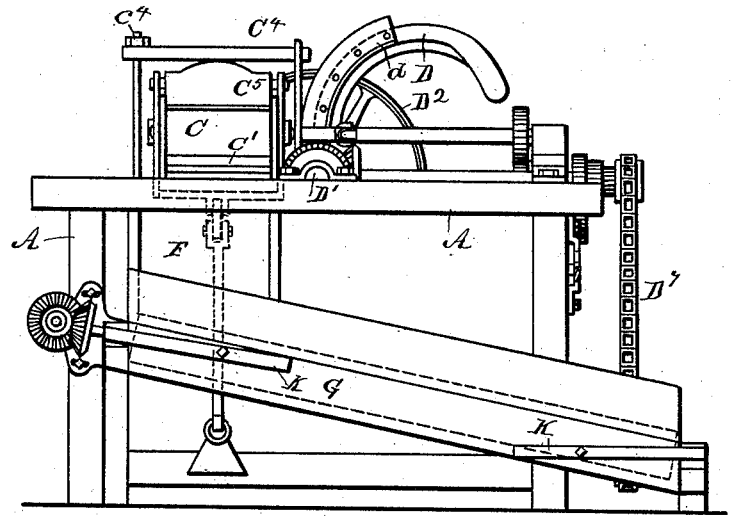
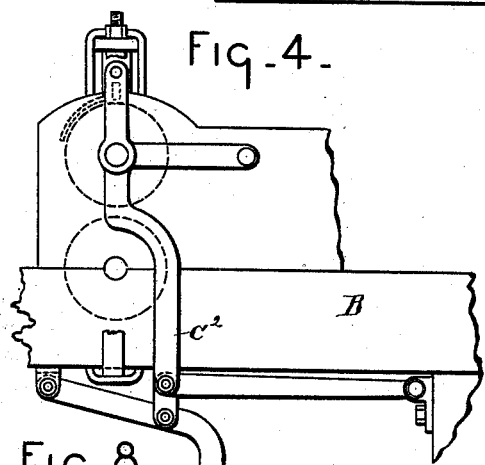
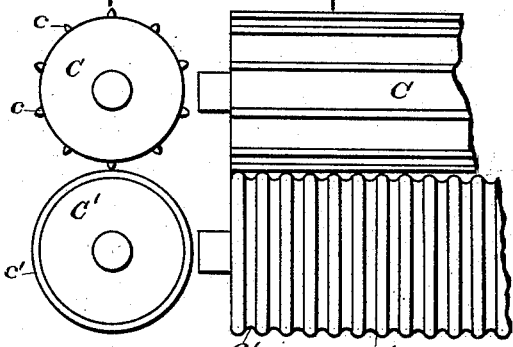
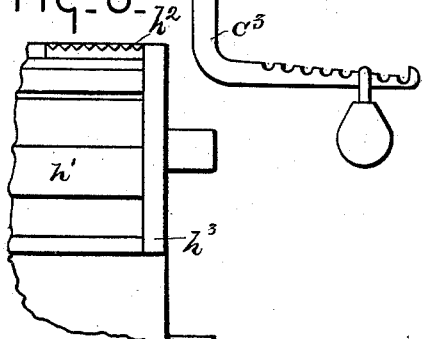
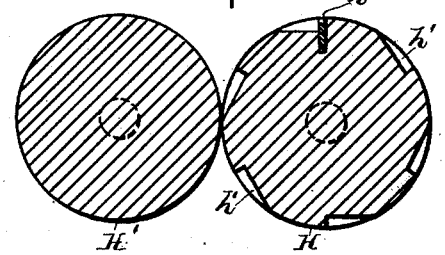
WITNESSES
INVENTORS:
Matthew Morton
William Rowan

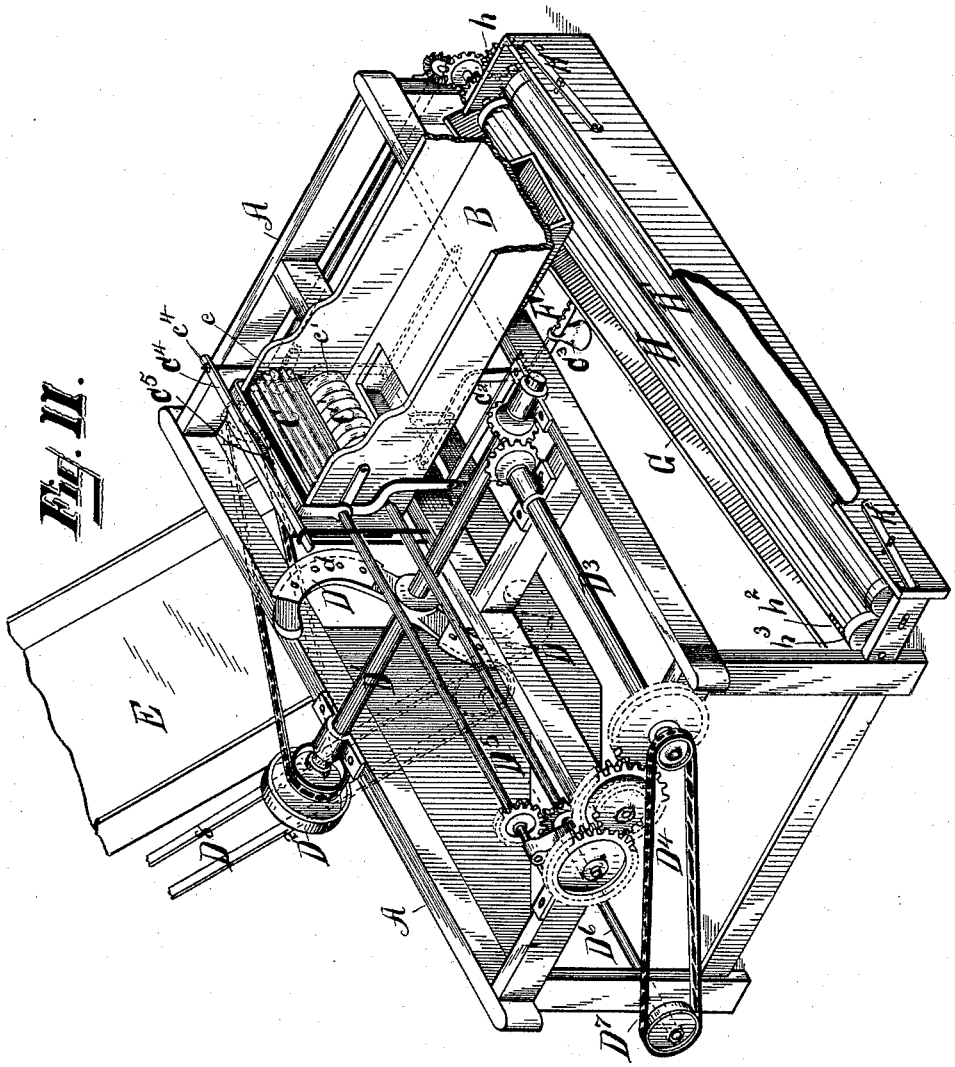

UNITED STATES PATENT OFFICE.

MATTHEW MORTON AND WILLIAM ROWAN, OF ROMEO, MICHIGAN.

COMBINED FEED-CUTTER AND CORN-HUSKER.

SPECIFICATION forming part of Letters Patent No. 468,817, dated February 16, 1892.

Application filed December 15, 1890. Serial No. 374,780. (No model.)

*To all whom it may concern:*

Be it known that we, MATTHEW MORTON and WILLIAM ROWAN, citizens of the United States, residing at Romeo, county of Macomb, State of Michigan, have invented a certain new and useful Improvement in a Combined Feed-Cutter and Corn-Husker; and we do declare the following to be a full, clear, and exact description of the invention, such as will enable others skilled in the art to which it pertains to make and use the same, reference being had to the acompanying drawings, which form a part of this specification.

In the drawings, Figure 1 is a plan view of the feed-cutter embodying our invention. Fig. 2 is a side elevation of the same on the side toward which the ears of corn are discharged. Fig. 3 is an end elevation of the machine. Fig. 4 is a separate view illustrating the mechanism for detaching the ears from the stalks. Fig. 5 shows the relative construction of the upper and lower rollers shown in Fig. 4. Fig. 6 is a side elevation of the same. Fig. 7 is a sectional view of the husking-rollers. Fig. 8 is a side elevation of said rollers shown in Fig. 7. Fig. 9 is a removable plate for use when the device is not required as a husker. Fig. 10 is a sectional view through the cutting-blade and its carrier. Fig. 11 is an assemblage of all the parts of the machine.

It is the purpose of our invention to combine in a single machine a feed-cutter or ensilage-cutter and a corn-husker; also to make the said corn-husking mechanism in the form of an attachment adapted to connect with ordinary forms of feed-cutters.

In carrying out our invention, A represents the frame-work of a feed-cutting machine; B, its feeding-table; C C', the feeding-rollers, by which the fodder is fed forward to the cutters, and D represents the arms or brackets to which the cutters $d$ are attached. These are driven in the usual way—as, for instance, by a shaft D' and drive-pulley $D^2$. Bevel-gears may communicate motion to a shaft $D^3$, and this, through intermediate gearing $D^4$, may serve, through a shaft $D^5$, to drive the feed-rollers.

$D^6$ is another shaft driven by a chain $D^7$, which actuates the belt $D^8$ of an elevator E for elevating the cut feed. This elevator is in the nature of an attachment and may or may not be employed.

F is a chute located beneath the feed-table, and B' is a removable section of the feed-table, which may be put into place when the device is designed for use simply as a feed-cutter and removed when it is to be employed also for husking corn. G is a hopper into which the said chute leads at its lower end.

H H' are two rollers, preferably geared together by gears $h$ at their extremities, so as to roll together. One of these rollers is provided with longitudinal serrations $h'$, as shown in Figs. 7 and 8, while the other is preferably made plain.

The operation of the device will now in a general way be understood, and it is as follows: The section B' having been removed, the corn on the stalk is fed in the usual way between the rolls C C' to the cutter. The pressure of these rolls serves to break the ears of corn from their stems and force them out from their outer husks. The ears then drop into the chute F and pass therefrom into the hopper G at the head of the rolls H H'. The ear is here subjected to the action of these two rolls. The shoulders of the serrations $h'$ serve to engage the ears and strip off whatever inner husk may remain thereon and feed the same down through and discharge it beneath the machine. They also serve in like manner to engage the silk and remove and discharge the same. One of the said rollers H' being smooth, the ear of corn slides easily thereon and is prevented from being gripped by the serrations and crushed or carried down between the rollers. The ear of corn gradually slides down to the lower ends of the rollers and is discharged therefrom thoroughly husked and clean of its silk, and the machine accomplishes this husking and silking regardless of whether the ear of corn is straight or crooked, whether it is perfect or imperfect, and seems to operate equally well upon the short-pointed imperfect ears frequently found. We prefer to provide a short serrated edge $h^2$ near the discharge end of the roller H in order that it may catch and tear off any remnant of husk that may have persistently clung to the ear. The feed-roller G' is provided with circumferential corrugations $c'$ to embrace and carry the stalks, and the roller C with longitudinal corrugations $c$ to force the ears from the stalk. The roll having the circumferential corrugations tends to separate the stalks and carry one in each groove, which prepares them for husking and facilitates the work generally.

$C^2$ is a stirrup actuated by a weighted lever $C^3$, which holds the upper roll in contact with the lower roll for ordinary feed-cutting purposes. We may also, by increasing the weight, make this suffice for breaking the ears of corn from their stems.

To more effectually insure the breaking off of the ears from their stalks between the rolls, we provide additional spring-pressure on the upper roll by the spring-bar $C^4$, which is held at its inner end by any suitable means, and we provide a screw-rod at its outer end with a nut $c^4$ for applying the pressure to the spring-bar. This bar is provided on its under side with a piece $C^5$, which bears on the frame carrying the roll C. More or less play of the rolls may be allowed by proper adjustment of the nut $c^4$ to insure proper feeding of the stalks and fodder to be cut, but not enough to permit an ear of corn to pass through without being severed from its stem.

$d$ represents one of the cutting-knives. We prefer to form its holder or support D with a cross-section, as shown in Fig. 10, so that when either knife shall have performed its cut the fodder or other substance being cut shall not drag against the support after the knife has passed, but be instantly free to move forward unimpeded. This construction conduces to a light-running machine.

This corn-husking mechanism, it will be seen by an examination of Figs. 2 and 3, is adapted to be fitted to almost any of the ordinary feed-cutting machines, requiring only that an opening be made in the feed-table and be provided with a removable cover B' and that the feeding-rollers be provided with a heavier weight to hold them together or with a bar $C^4$ for a like purpose.

$h^3$ represents a plain collar or ledge at the extremities of the roller H. It is flush with the general surface of the roll and is designed to roll in contact with the roller H' and prevent the vibration that would otherwise arise by the serrated form of the roller H.

K represents any suitable spring mechanism whereby the roller H' is held snugly against the roller H, yielding only sufficiently to permit strippings of husk and silk to pass between them.

What we claim is—

1. In a combined feed-cutter and corn-husker, the feed-rollers C and C', one of which is provided with circumferential corrugations adapted to embrace the stalks and the other provided with longitudinal corrugations for separating the ears, in combination with a table and cutter, a chute for conducting the separated ears to the huskers, and husking-rollers H and H', substantially as described.

2. The combination, with the upper and lower feed-rollers C C', of the adjustable bar $C^4$ and nut $c^4$, substantially as shown and described.

3. The combination, with the inclined husking-rollers H H', one of which is plain and the other provided with longitudinal serrations $h'$, serrated edge $h^2$, and plain collars or ledges $h^3$, of the springs K K for pressing said rollers together, substantially as shown and described.

4. A combined feed-cutter and corn-husker comprising the feed-rollers C C', the cutters D $d$, the husking-rollers H H', and the table B, having a removable inner section B', adapted to be removed when the husker is to be used and to be replaced when the machine is to be used solely as a feed-cutter, substantially as set forth.

In testimony whereof we sign this specification in the presence of two witnesses.

MATTHEW MORTON.
WILLIAM ROWAN.

Witnesses:
MARION A. REEVE,
W. H. CHAMBERLIN.